United States Patent
Bombled et al.

(10) Patent No.: US 10,556,693 B2
(45) Date of Patent: Feb. 11, 2020

(54) METHOD FOR VENTILATING A RAM AIR CHANNEL AND ENVIRONMENTAL CONTROL DEVICE AND VEHICLE IMPLEMENTING THIS METHOD

(71) Applicant: LIEBHERR-AEROSPACE TOULOUSE SAS, Toulouse (FR)

(72) Inventors: Cécile Bombled, Castelginest (FR); Frédéric Sanchez, Labastide-Saint-Sernin (FR)

(73) Assignee: LIEBHERR-AEROSPACE TOULOUSE SAS, Toulouse (FR)

( * ) Notice: Subject to any disclaimer, the term of this patent is extended or adjusted under 35 U.S.C. 154(b) by 112 days.

(21) Appl. No.: 15/902,587

(22) Filed: Feb. 22, 2018

(65) Prior Publication Data
US 2018/0237143 A1 Aug. 23, 2018

(30) Foreign Application Priority Data
Feb. 23, 2017 (FR) .................................. 17 51443

(51) Int. Cl.
*B64D 13/06* (2006.01)
(52) U.S. Cl.
CPC ...... *B64D 13/06* (2013.01); *B64D 2013/0618* (2013.01)
(58) Field of Classification Search
CPC ............ B64D 13/06; B64D 2013/0618; B64D 13/02; B64D 13/08; B64D 13/04; B64D 13/00; B64D 37/32; Y02T 50/56; Y02T 50/44
See application file for complete search history.

(56) References Cited

U.S. PATENT DOCUMENTS

| 2,870,698 | A | 1/1959 | Best |
| 3,842,720 | A | 10/1974 | Herr |
| 7,797,962 | B2 * | 9/2010 | Kresser ................. B64D 13/06 62/401 |
| 9,205,925 | B2 * | 12/2015 | Bruno ................... B64D 13/02 |
| 2007/0113579 | A1 | 5/2007 | Claeys et al. |
| 2013/0118191 | A1 * | 5/2013 | Zywiak ................. B64D 13/06 62/87 |
| 2015/0329210 | A1 * | 11/2015 | Bammann .......... B60H 1/00435 62/61 |
| 2016/0083100 | A1 * | 3/2016 | Bammann .............. B64D 13/06 62/89 |
| 2016/0214722 | A1 * | 7/2016 | McAuliffe ............ B64D 13/06 |

FOREIGN PATENT DOCUMENTS

EP 2 062 818 A1 5/2009

OTHER PUBLICATIONS

FR Search Report, dated Oct. 30, 2017, from corresponding FR 1751443 application.

* cited by examiner

*Primary Examiner* — Emmanuel E Duke
(74) *Attorney, Agent, or Firm* — IPSilon USA, LLP

(57) ABSTRACT

Disclosed is a method for ventilating a ram air channel for a vehicle—in particular an aircraft—including at least one heat exchanger. The ram air channel is provided with a jet pump including a plurality of compressed air inlets connected to a plurality of separate compressed air sources of the vehicle, and a plurality of compressed air outlet nozzles. At least two nozzles are independently connected to at least two separate compressed air sources of the vehicle.

20 Claims, 3 Drawing Sheets

Figure 1:
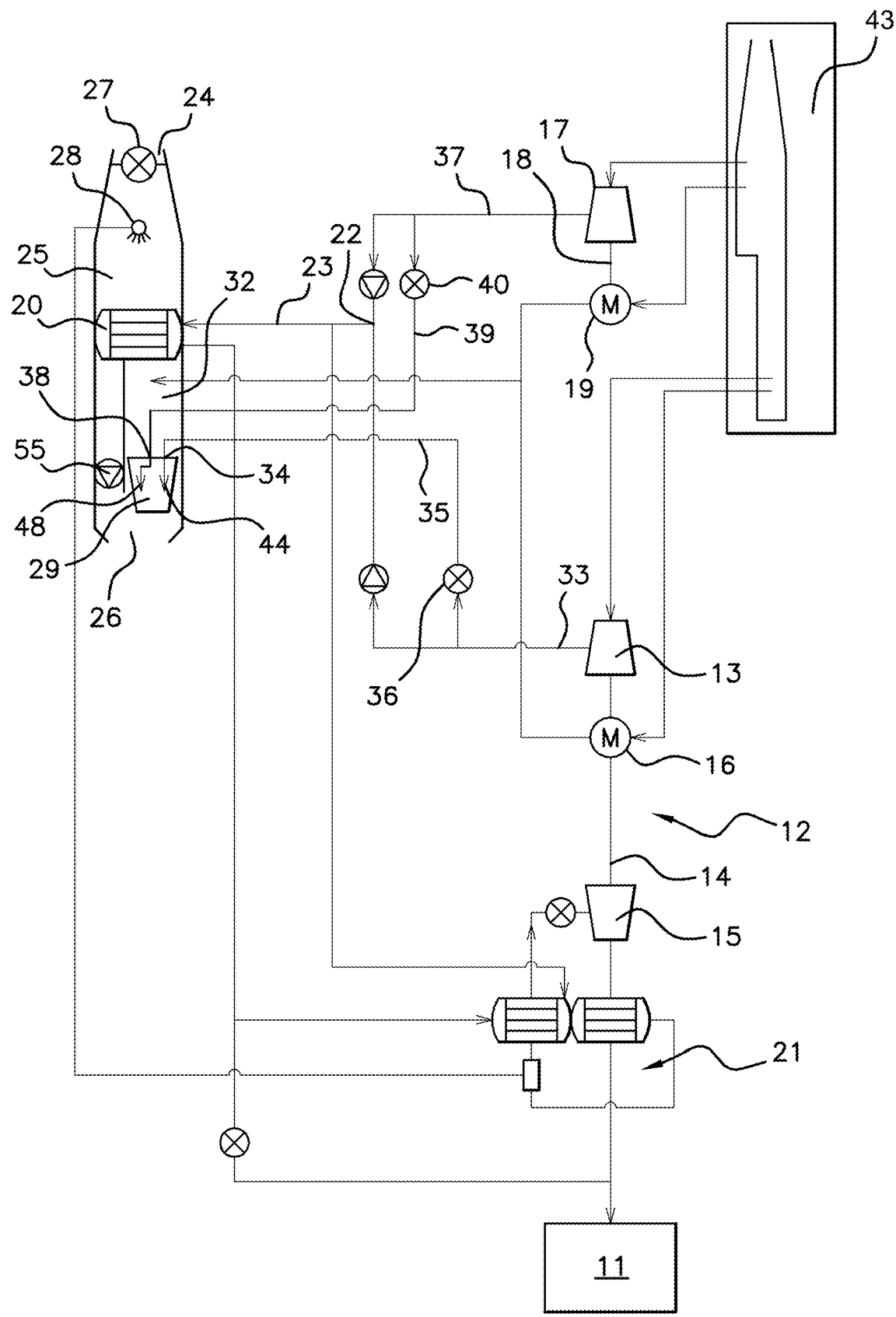

METHOD FOR VENTILATING A RAM AIR CHANNEL AND ENVIRONMENTAL CONTROL DEVICE AND VEHICLE IMPLEMENTING THIS METHOD

The invention relates to a method for ventilating a ram air channel for a vehicle, in particular an aircraft. It relates to an environmental control device of at least one vehicle cabin—in particular of an aircraft—in which such a ventilation method is implemented. It also relates to a vehicle—in particular an aircraft—provided with an environmental control device in accordance with the invention.

Throughout the text, the term "cabin" denotes any interior space of a vehicle—in particular an aircraft—in which the pressure and/or temperature of the air must be controlled. It can thus equally be a passenger cabin or a cockpit, a hold, a cargo-loading space . . . . The expression "environmental control" denotes the act of controlling the temperature and/or pressure and/or humidity and/or composition (quality) of the air in a cabin.

Furthermore, the expression "compressed air source" denotes any device capable of generating a flow of air at a pressure greater than the ambient static pressure (i.e. atmospheric pressure), independently of the movement of the vehicle. In particular, the term "compressor" denotes any device capable of converting mechanical energy into pneumatic energy, i.e. into compressed air; this term thus equally denotes in particular a machine (in particular a radial-circulation or axial-circulation rotating machine or a piston machine) delivering compressed air or a machine part, e.g. a compression stage or a compression wheel, of a machine delivering compressed air. For example, several compression stages or wheels of a single machine delivering compressed air constitute several compressed air sources.

Vehicle cabins are most often provided with at least one environmental control device. Vehicles moving at relatively high speed such as aircraft or high-speed trains are provided with at least one ram air channel allowing the reception of air at ram air pressure under the effect of the movement of the vehicle and allowing the feeding of at least one heat exchanger placed in the ram air channel and associated with an environmental control device. Such a heat exchanger can be for example an intermediate exchanger (i.e. interposed between the compressor and the turbine) of an air-cycle cooling turbocompressor (whether or not provided with an electric drive motor); a cooling exchanger between several compressors—in particular between a first electric motor compressor and a compressor of an air-cycle cooling turbocompressor (whether or not provided with an electric drive motor); an exchanger for pre-cooling air drawn over a turboreactor compressor; any other heat exchanger for cooling a fluid other than air (coolant, fuel, . . . ), . . . .

The general problem with such devices is that of ventilating such a ram air channel when the speed of the vehicle is insufficient, in particular when the vehicle is stationary, or—in the case of an aircraft—during taxiing. In fact, the need for cooling of the cabin air can be great in these conditions, and thus can require optimal operation of the environmental control device, and in particular of each heat exchanger interposed in each ram air channel.

U.S. Pat. No. 7,797,962 describes in particular a method for ventilating such a ram air channel in which a jet pump is placed in the ram air channel downstream of the exchanger, this jet pump being fed with compressed air via regulating valves from a portion of the air flow delivered by the compressor of an air-cycle motorised turbocompressor and/or from an air flow delivered by a second compressed air source such as a second motorised compressor or from the air drawn over a compressor of a turboreactor of the aircraft.

By using such a method and such a device, the jet pump is said to be able to operate with one and/or the other of the compressed air sources, including in non-steady states when either one of these compressed air sources is shut off or is malfunctioning. The jet pump must thus be able to operate in a large range of inlet pressures and flowrates. However, although such a jet pump can be optimised for one operating point, its performances generally greatly decrease when the inlet pressure and/or flowrate vary(ies) with respect to this operating point. It should also be noted in this regard that the jet pump of a dynamic air channel must furthermore be particularly compact so as not to itself interfere with the circulation of the air flow in the channel and must be of as low a mass as possible so as not to add to the weight of the vehicle. These constraints accordingly increase the problem of optimising the operating point, which is all the more sensitive because the jet pump is of reduced dimensions and/or weight. Furthermore, impaired operation of the jet pump results not only in insufficient ventilation of the ram air channel but also in a very loud noise which can be a considerable nuisance in the surroundings of the vehicle or for the passengers of the vehicle, in particular in the case of an airliner or a train.

Furthermore, when several rotary compressors are connected to the same jet pump, there is a risk that a malfunction (e.g. surge) of one compressor has inappropriate repercussions on the operation of another compressor via the jet pump. To avoid this, it is necessary to provide specific arrangements for controlling the valves feeding the jet pump, which makes the system more complex.

The invention thus generally aims to overcome these disadvantages by proposing a method for ventilating a ram air channel by means of which each jet pump can be fed from one and/or the other of a plurality of compressed air sources of the vehicle whilst being operated in an optimum manner—in particular with improved ventilation performances and a reduction in acoustic noise generated by the jet pump—in a large range of inlet pressures and inlet flowrates.

The invention also aims to obtain these results with reduced mass and size, compatible with the constraints of integrating the jet pump into a ram air channel.

The invention also aims to simplify the management of feeding each jet pump of a ram air channel from different compressed air sources, whilst avoiding any inappropriate interference from several compressed air sources therebetween via a jet pump, in particular when at least one of these compressed air sources is a rotary compressor.

The invention also aims to propose an environmental control device for the vehicle cabin—in particular of an aircraft—having the same advantages.

The invention thus relates to a method for ventilating a ram air channel for a vehicle, in particular an aircraft, said ram air channel comprising:
 a ram air inlet capable of receiving an air flow at ram air pressure under the effect of a movement of the vehicle,
 at least one heat exchanger arranged to be able to receive at least one portion of said ram air flow,
method in which the ram air channel is provided with at least one jet pump arranged to be able to be fed with compressed air delivered by compressed air sources of the vehicle, characterised in that the ram air channel is provided with at least one jet pump, named multiple jet pump:

comprising a plurality of compressed air inlets and a plurality of compressed air outlet nozzles, each nozzle being connected to at least one of said compressed air inlets, of which said compressed air inlets are connected to a plurality of (separate) compressed air sources of the vehicle, of which a first nozzle is connected to at least one first compressed air inlet connected to at least one first compressed air source of the vehicle, this first nozzle being able to receive compressed air delivered by at least one such first compressed air source of the vehicle, of which at least one nozzle, named second nozzle, separate from said first nozzle is:
  isolated from each first compressed air inlet,
  connected to at least one inlet, named second compressed air inlet:
    separate from each first compressed air inlet,
    and connected to at least one compressed air source of the vehicle, named second compressed air source, separate from each first compressed air source, each second nozzle being able to receive compressed air delivered by at least one such second compressed air source without being able to receive compressed air delivered by any first compressed air source (i.e. by any compressed air source connected to a first compressed air inlet connected to said first nozzle).

The invention relates to an environmental control device of at least one vehicle cabin—in particular of an aircraft—in which a method in accordance with the invention for ventilating at least one ram air channel is implemented. The invention thus relates to an environmental control device of at least one vehicle cabin—in particular of an aircraft—comprising:
  a plurality of compressed air sources,
  at least one ram air channel, comprising:
    a ram air inlet capable of receiving an air flow at ram air pressure under the effect of a movement of the vehicle,
    at least one heat exchanger arranged to be able to receive at least one portion of said ram air flow,
    at least one jet pump arranged to be able to be fed with compressed air delivered by at least some of said compressed air sources, characterised in that at least one ram air channel comprises at least one jet pump, named multiple jet pump:
      comprising a plurality of compressed air inlets and a plurality of compressed air outlet nozzles, each nozzle being connected to at least one of said compressed air inlets,
      of which said compressed air inlets are connected to a plurality of said compressed air sources,
      of which a first nozzle is connected to at least one first compressed air inlet connected to at least one first compressed air source, this first nozzle being able to receive compressed air delivered by at least one such first compressed air source,
      of which at least one nozzle, named second nozzle, separate from said first nozzle is:
        isolated from each first compressed air inlet,
        connected to at least one inlet, named second compressed air inlet:
          separate from each first compressed air inlet,
          and connected to at least one compressed air source, named second compressed air source, separate from each first compressed air source,
each second nozzle being able to receive compressed air delivered by at least one such second compressed air source without being able to receive compressed air delivered by any first compressed air source (i.e. by any compressed air source connected to a first compressed air inlet connected to said first nozzle).

The invention also relates to a method for ventilating a ram air channel implemented in an environmental control device in accordance with the invention of least one vehicle cabin—in particular of an aircraft.

In particular, in a method and device in accordance with the invention, a first compressed air inlet of a single multiple jet pump is connected to at least one first compressed air source of the vehicle in order to be able to receive compressed air delivered by at least one such first compressed air source of the vehicle; and a second compressed air inlet of this single multiple jet pump, separate from said first compressed air inlet, is connected to at least one second compressed air source of the vehicle, separate from each first compressed air source of the vehicle in order to be able to receive compressed air delivered by at least one such second compressed air source of the vehicle. Each nozzle connected to such a second compressed air inlet is not connected to said first compressed air inlet.

Whilst the fact of independently feeding several different nozzles, and in particular several different compressed air inlets, of a single multiple-jet pump of a ram air channel could be considered at first glance to be a disadvantage—in particular owing to the fact that such feeding supposes several separate ducts to independently connect each compressed air inlet of the multiple jet pump to at least one of the compressed air sources of the vehicle—the inventors have noted to the contrary that the use of a multiple jet pump with several inlets and several independent outlet nozzles independently connected to separate compressed air sources allows in reality a considerable gain to be made in terms of aerodynamic and acoustic performances of the pump and in terms of the mass and general size of the device, and likewise allows a major simplification in the management of the different compressed air sources, in particular in the case of rotary compressors in which a surge is likely.

A single ram air channel is provided with at least one multiple jet pump, but can comprise several jet pumps, e.g. one multiple jet pump or several multiple jet pumps; one single jet pump (i.e. provided with a single nozzle) or several single jet pumps. Nevertheless, in some preferred embodiments in accordance with the invention, a single ram air channel is provided with a single jet pump which is a multiple jet pump in accordance with the invention.

Preferably, in a single ram air channel, at least one multiple jet pump in accordance with the invention is arranged downstream of at least one—in particular each—heat exchanger of the ram air channel. In fact, in general, each heat exchanger of such a ram air channel is used for cooling a fluid (in particular of the air intended for at least one cabin) from air at ram air pressure circulating in the ram air channel. It is thus preferable that the compressed air injected into the ram air channel by such a jet pump, which is at a relatively high temperature, is at such a temperature only downstream of such a cooling exchanger. That being said, there is nothing to prevent the provision, in some applications, of at least one jet pump, including a multiple jet pump, upstream of at least one exchanger of the ram air channel.

Similarly, an environmental control device in accordance with the invention can comprise several ram air channels. Nevertheless, in some preferred embodiments in accordance with the invention, the environmental control device in accordance with the invention comprises a single ram air channel.

In a method and a device in accordance with the invention, each second nozzle which is separate from said first nozzle is not connected to each first compressed air inlet, i.e. to each compressed air inlet connected to this first nozzle. Therefore, each second nozzle can be fed with compressed air from at least one second compressed air source which is not a first compressed air source feeding said first nozzle. This condition involves a separation of the pneumatic feeding of at least two separate nozzles from at least two separate compressed air sources, but does not prevent provision being made that at least one nozzle—or each nozzle—of a multiple-jet pump is arranged to be able to receive compressed air from several compressed air sources of the vehicle. Therefore, for example, said first nozzle can be connected to several separate first compressed air sources. Similarly, each second nozzle can be connected to several separate second compressed air sources, none of these being a first compressed air source (connected to said first nozzle). That being said, in some advantageous embodiments of the invention, each nozzle of at least one multiple jet pump—in particular of each multiple jet pump—is connected to a single compressed air source, i.e. it can receive compressed air from only one single compressed air source.

The invention is also applicable with compressed air sources available on-board the vehicle which can be of any kind (drawing compressed air over a compression stage of a turboreactor, rotary compressor of a turbocompressor whether or not provided with an electric motor, pressurised cabin, air flows for ventilating or cooling components of the vehicle, . . . ). Each of the compressed air sources is capable of delivering compressed air independently of the movement of the vehicle, i.e. including when the vehicle is moving at low speed or is stationary.

In some advantageous embodiments in accordance with the invention, at least one—in particular each—of said compressed air sources connected to a single multiple jet pump of a ram air channel is a compressor—in particular a rotary compressor, more particularly a rotary compressor driven at least by an electric motor (solely by such an electric motor and/or optionally by another driving device such as a turbine)—of an environmental control device for at least one cabin of the vehicle. In particular, advantageously and in accordance with the invention, at least one of said first and second compressed air sources is a rotary compressor of an environmental control device of at least one cabin of the vehicle. Therefore, at least one rotary compressor of an environmental control device of at least one cabin of the vehicle is connected to at least one inlet of a multiple jet pump.

In these embodiments, advantageously and in accordance with the invention, each nozzle of a single jet pump—in particular of a single multiple jet pump—of a ram air channel is connected to at most one rotary compressor. Therefore, if a nozzle is connected to a rotary compressor and to another compressed air source, this other compressed air source is not a rotary compressor of the vehicle. More particularly, advantageously and in accordance with the invention, a single nozzle of a jet pump—in particular of a multiple jet pump—connected to a rotary compressor of the vehicle is connected solely to this rotary compressor to the exclusion of any other compressed air source of the vehicle. Therefore, if the vehicle comprises several rotary compressors, two separate rotary compressors of the vehicle are not connected to a single nozzle of a single jet pump, in particular to a single nozzle of a single multiple-jet pump. In this manner, any coupling and any interference between two rotary compressors via a nozzle of a jet pump is avoided, in particular in the event of a surge in a rotary compressor.

Conversely, there is nothing to prevent provision being made that at least one—in particular each—compressed air source of the vehicle is connected to several nozzles of a single multiple jet pump. For example, a second compressed air source of the vehicle can be connected to several second nozzles of a single multiple-jet pump. In particular, a single rotary compressor—in particular a single rotary compressor driven by an electric motor—of the vehicle can be connected to several nozzles of a single multiple jet pump.

Equally, there is nothing to prevent provision being made that at least one nozzle—or each nozzle—of a multiple jet pump is connected to several separate compressed air inlets of the multiple jet pump. Therefore, for example, the first nozzle can be connected to several separate first compressed air inlets. Similarly, the second nozzle can be connected to several separate second compressed air inlets, none of which being a first compressed air inlet, i.e. being connected to the first nozzle. That being said, in some advantageous embodiments of the invention, each nozzle of at least one multiple jet pump—in particular of each multiple jet pump—is connected to a single compressed air inlet of this multiple jet pump, i.e. it can receive compressed air from only one single compressed air inlet.

Furthermore, there is nothing to prevent provision being made that at least one—in particular each—compressed air inlet of at least one—in particular each—multiple jet pump is connected to several compressed air sources of the vehicle.

That being said, in some advantageous embodiments of the invention, each compressed air inlet of at least one—in particular each—multiple jet pump is connected to at most one rotary compressor of the vehicle. Therefore, if a compressed air inlet is connected to a rotary compressor and to another compressed air source, this other compressed air source is not a rotary compressor. More particularly, advantageously and in accordance with the invention, any compressed air inlet of a jet pump—in particular of a multiple jet pump—connected to a rotary compressor of the vehicle is connected solely to this rotary compressor to the exclusion of any other compressed air source of the vehicle. Therefore, if the vehicle comprises several rotary compressors, two separate rotary compressors of the vehicle are not connected to a single compressed air inlet of a single jet pump, in particular to a single nozzle of a single multiple jet pump. In this manner, any coupling and any interference between two rotary compressors via a compressed air inlet of a jet pump is avoided, in particular in the event of a surge in a rotary compressor.

In some particular embodiments of the invention, each compressed air inlet of at least one—in particular each—multiple jet pump is connected to a single compressed air source—in particular to a single rotary compressor—of the vehicle, each compressed air inlet and each nozzle of this multiple jet pump being capable of only receiving compressed air delivered by a single compressed air source—in particular by a single rotary compressor—of the vehicle.

Furthermore, there is nothing to prevent provision conversely being made that at least one single compressed air source of the vehicle is connected to several compressed air inlets of a single multiple jet pump, or of several (multiple- or single-) jet pumps of the same ram air channel or of several ram air channels of the vehicle. In particular, several compressed air inlets of a single multiple jet pump can be connected to a single compressed air source of the vehicle.

That being said, in some advantageous embodiments of the invention, each compressed air source of the vehicle connected to at least one multiple-jet pump of at least one—in particular each—ram air channel is connected to a single compressed air inlet of this multiple jet pump. In other words, each compressed air source of the vehicle is connected to a single compressed air inlet of each multiple jet pump which it feeds with compressed air. And the different compressed air inlets of a single multiple jet pump are connected independently of each other to different compressed air sources of the vehicle, each compressed air inlet being connected to a compressed air source of the vehicle which appertains to it, two separate compressed air inlets of a single multiple jet pump being connected to two separate compressed sources of the vehicle, respectively.

Preferably, for a single ram air channel, each compressed air source—in particular each rotary compressor—of the vehicle is connected to a single jet pump—in particular to a single compressed air inlet of a single multiple jet pump—of this ram air channel.

In a method and a device in accordance with the invention, a single compressed air inlet of a multiple jet pump can be connected to a single nozzle of this multiple jet pump, or—in contrast—to several nozzles of this multiple jet pump.

The invention is particularly advantageously applicable to an aircraft comprising an environmental control device provided with several rotary compressors, each driven at least by an electric motor. In this particular application, advantageously and in accordance with the invention, the compressed air inlets of a single multiple jet pump of a single ram air channel are connected to a plurality of such separate rotary compressors, each compressed air inlet of the pump being solely connected to a single rotary compressor in order to be able to receive solely compressed air delivered by this rotary compressor. In particular, the invention allows one and/or the other of the rotary compressors of an environmental control device of at least one aircraft cabin to be relieved, and e.g. to avoid a surge in the rotary compressor. Furthermore, in the event of a surge in a rotary compressor, there is no danger that this surge will cause a malfunction in another compressed air source, in particular another compressor.

Furthermore, a multiple jet pump of a device in accordance with the invention can be the subject of various structural embodiment variants. In some advantageous embodiments in accordance with the invention, the jet pump has at least one first central nozzle connected to a first compressed air inlet and at least one series of nozzles, named second peripheral nozzles, connected to a second compressed air inlet and extending around each first central nozzle.

Therefore, the different nozzles can be advantageously arranged so as to deliver the compressed air in the same general injection direction, and in particular by being arranged in concentric circles, a plurality of nozzles arranged in a single circle being connected to a single compressed air inlet of the pump. Such an arrangement facilitates the mixing of different compressed air flows when the different compressed air inlets are fed, and makes the behaviour of the jet pump consistent regardless of whichever of the one and/or the other of the compressed air inlets is/are fed. This results in aerodynamic and acoustic performances of the jet pump which can thus be optimised.

In some advantageous embodiments of a method and a device in accordance with the invention, a multiple jet pump comprises between three and eight outlet nozzles, and in particular advantageously a first central outlet nozzle and three to six second peripheral nozzles. In a preferred embodiment, a multiple jet pump comprises four second peripheral nozzles.

Furthermore, in some advantageous embodiments of the invention, the jet pump comprises:
  an outlet plenum arranged to be able to receive the compressed air delivered by each nozzle,
  an air inlet, named low-pressure air inlet, arranged to receive air from the ram air inlet of the ram air channel and to cause said air to circulate in said plenum,
  said nozzles and said low-pressure air inlet being arranged such that the compressed air from any one of the nozzles can mix in said plenum with the air delivered by said low-pressure air inlet, forming a combination flow of air causing ventilation of the ram air channel preferably, said low-pressure air inlet and the plenum are interposed in series in the ram air channel, the low-pressure air inlet receiving all of the flow of air passing through the ram air channel.

Furthermore, the arrangement of the low-pressure air inlet in the jet pump can be the subject of different embodiment variants. Therefore, there is nothing to prevent provision being made that the low-pressure air inlet is an axial air inlet, coaxial with the compressed air outlet nozzles. That being said, in some advantageous embodiments, said low-pressure air inlet is a radial air inlet to the nozzles of the jet pump. Such a radial low-pressure air inlet delivers the air at low pressure in the plenum in a radial direction from the outside to the inside with respect to the general injection direction defined by the nozzles.

Equally, in some advantageous embodiments, said plenum is in the form of a Venturi tube, i.e. it has a neck (area of the plenum with a smaller cross-section, considered independently of the nozzles), the nozzles are arranged in order to be able to deliver compressed air to the neck or upstream of the neck, and said low-pressure air inlet is arranged to feed the plenum upstream of the neck. The cross-section of the plenum upstream of the neck is preferably greater than that of the neck, i.e. forms a segment tapering towards the neck. The cross-section of the plenum downstream of the neck is preferably likewise greater than that of the neck and forms a segment diverging away from the neck.

Furthermore, in some advantageous embodiments in accordance with the invention, the ram air channel is provided with a duct for bypassing the jet pump, this bypass duct connecting a zone of the ram air channel upstream of said low-pressure air inlet of the jet pump to said plenum. Furthermore, advantageously and in accordance with the invention, said bypass duct is provided with a valve adapted to:
  allow a circulation of air in the bypass duct when no compressed air inlets of the jet pump are fed with compressed air,
  allow a circulation of air in the low-pressure air inlet of the jet pump when at least one of the compressed air inlets of the jet pump is fed with compressed air. Therefore, the jet pump does not interfere with the ram air circulation in the ram air channel when the vehicle is moving at a sufficient speed, but allows suitable ventilation of the ram air channel when the jet pump is fed with compressed air because the vehicle is not moving at a sufficient speed.

In general, a ram air channel of a vehicle likewise has an outlet for the air to the atmosphere outside of the vehicle after having passed through the ram air channel consequently, advantageously and in accordance with the invention, said nozzles of the jet pump deliver compressed air in the direction of such an air outlet of the ram air channel into the atmosphere outside of the vehicle. Similarly, said plenum communicates with an air outlet of the ram air channel to the atmosphere outside of the vehicle, or forms such an air outlet of the ram air channel. However, the invention is likewise applicable to embodiments where the ram air channel has an air outlet which does not communicate with the atmosphere outside of the vehicle.

The invention thus allows a ram air channel to be ventilated, i.e. a flow of air to be generated in the ram air channel independently of the movement of the vehicle, in a redundant manner by several compressed air sources. It is thus possible in particular for one and/or the other compressed air source to be relieved as required whilst maintaining the function of ventilating the ram air channel. The invention likewise allows the aerodynamic and acoustic performances of the jet pump to be optimised, this jet pump being able to be adapted and optimised for the different compressed air sources of the vehicle. In particular, each compressed air inlet and each outlet nozzle can be specifically adapted and optimised to the characteristics of the compressed air delivered by the compressed air source to which this compressed air inlet is connected. Furthermore, in comparison with a single jet pump, for the same ventilation effect, the injection pressure leaving the nozzles can be reduced, and the agitation of the air in the ram air channel is improved. The aerodynamic performance of the multiple jet pump can be fully maintained in the event of a malfunction in one of the compressed air sources, for example in the event of a surge in a rotary compressor, by feeding the multiple jet pump from another compressed air source.

The invention relates to a vehicle—in particular an aircraft—characterised in that it comprises at least one environmental control device in accordance with the invention and/or in which a method in accordance with the invention for ventilating at least one ram air channel is implemented.

The invention likewise relates to a ventilation method, an environmental control device of at least one vehicle cabin—in particular of an aircraft—and a vehicle—in particular an aircraft—which are characterised in combination by all or some of the features mentioned above or below.

Figure 2:
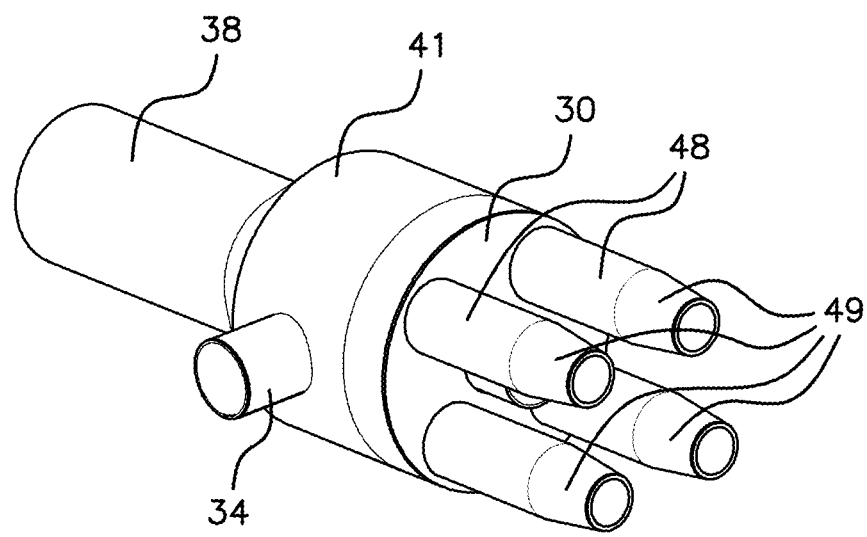
Figure 3:
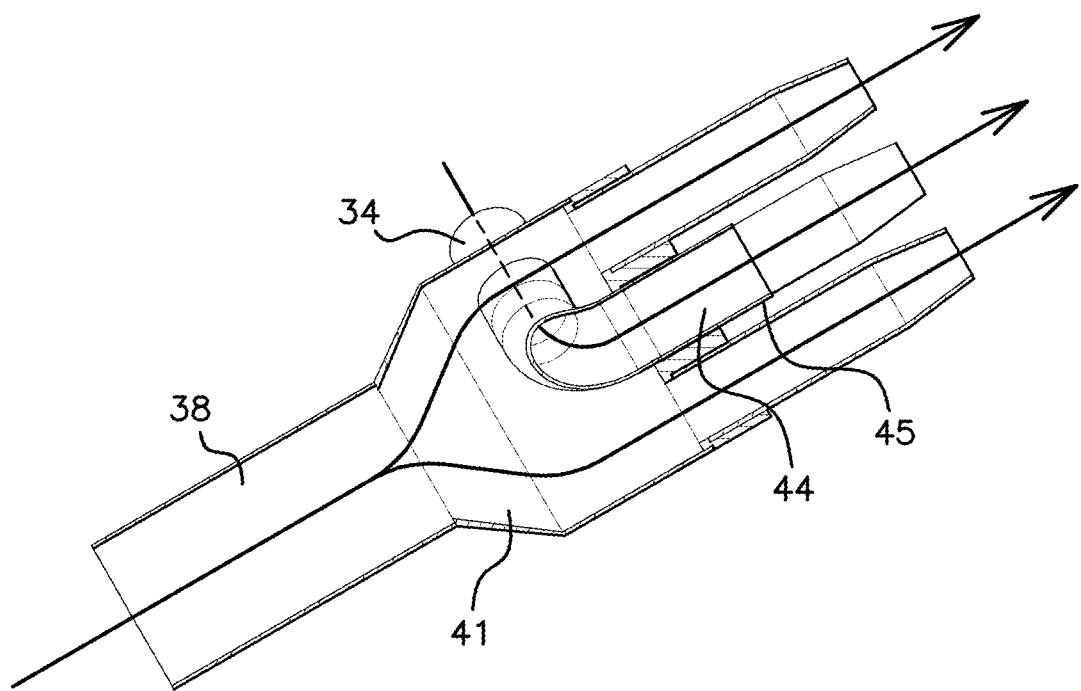
Figures 4, 5:
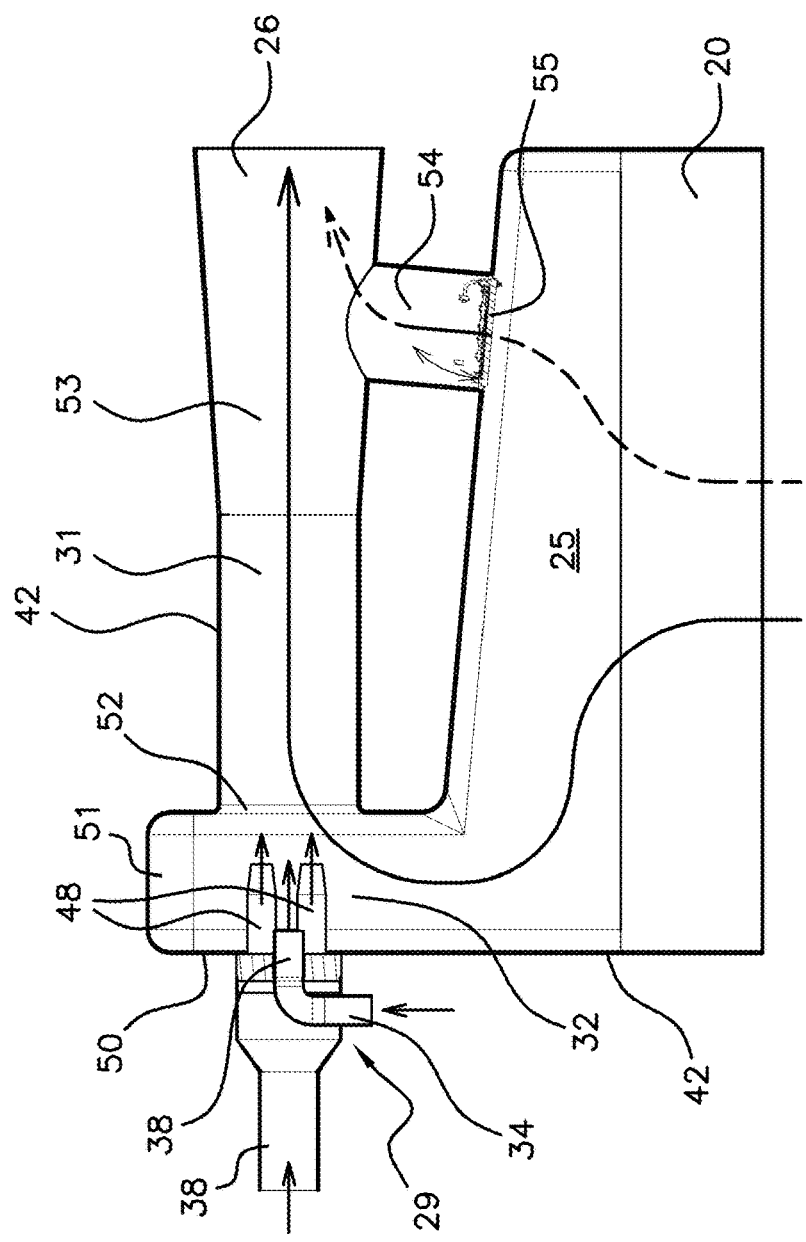

Other aims, features and advantages of the invention will become apparent upon reading the following description given by way of non-limiting example and which makes reference to the attached figures in which:

FIG. 1 is a general schematic diagram of an example of an aircraft environmental control device in accordance with one embodiment of the invention, in which a method in accordance with the invention for ventilating a ram air channel is implemented, FIGS. 2 and 3 are schematic views, respectively in perspective and in axial cross-section, illustrating an exemplified embodiment of nozzles of a jet pump of an environmental control device in accordance with the invention implementing a ventilation method in accordance with the invention, FIG. 4 is a schematic elevation of an exemplified embodiment of an outlet segment of a ram air channel of an environmental control device in accordance with the invention comprising a jet pump for implementing a ventilation method in accordance with the invention, FIG. 5 is a schematic, axial cross-sectional view along line V-V in FIG. 4.

FIG. 1 illustrates an example of an environmental control device in accordance with the invention for an aircraft cabin 11. This environmental control device is of the air-cycle type and comprises:
- a motorised air-cycle machine 12 comprising a first rotary compressor 13 driven by a shaft 14 to which a turbine 15 and an electric motor 16 are coupled,
- a second rotary compressor 17 driven by a motor 19 coupled to the shaft 18 of the compressor,
- an intermediate exchanger 20, of which a first circuit (hot pass) is interposed between the outlets of the compressors 13, 17 and the inlet of the turbine 15 via a water extraction loop 21. This intermediate exchanger 20 allows the compressed air delivered by each compressor 13, 17 to be cooled before being introduced into the water extraction loop 21 and into the turbine 15.

The compressors 13, 17 are fed by air from an air inlet loop 43 or a scoop picking up the air outside of the aircraft. The outlets of the two compressors 13, 17 deliver compressed air into outlet ducts 33 and 37 respectively which join up at a node 22 connected by a duct 23 to the first circuit of the intermediate exchanger 20.

The intermediate exchanger 20 is interposed in a ram air channel 25 having a ram air inlet 24 capable of receiving a flow of air at ram air pressure under the effect of the movement of the aircraft and, opposite to this ram air inlet 24, a ram air outlet 26 sending the air which has passed through the ram air channel 25 into the atmosphere. The ram air inlet 24 is provided with a valve 27 allowing the cross-section of this air inlet 24 to be adjusted. The water extracted in the water extraction loop 21 is advantageously injected into the ram air channel 25 by an injector 28 upstream of the intermediate exchanger 20 in order to increase the cooling capacity. The air circulating in the ram air channel 25 passes through a second circuit (cold pass) of the intermediate exchanger 20.

A multiple jet pump 29 is placed in the ram air channel 25 downstream of the intermediate exchanger 20 in order to ventilate the ram air channel 25 when the aircraft is on the ground. This multiple jet pump 29 has, in the illustrated example, two compressed air inlets 34, 38. The first compressed air inlet 34 is connected to the outlet duct 33 of the first compressor 13 by a duct 35 via a first feed valve 36 of the jet pump 29. The second compressed air inlet 38 is connected to the outlet duct 37 of the second compressor 17 by a duct 39 via a second feed valve 40 of the jet pump 29. The jet pump 29 is thus connected in parallel to several ducts 35, 39 for feeding compressed air.

Consequently, when the first valve 36 is open, the first inlet 34 of the jet pump 29 is fed with compressed air from the first compressor 13. Similarly, when the second valve 40 is open, the second inlet 38 of the jet pump 29 is fed with compressed air from the second compressor 17. These two feed valves 36, 40 of the jet pump 29 are independently controlled valves and can be controlled independently of one another by a control unit of the environmental control device in accordance with the invention.

The jet pump 29 likewise comprises an inlet, named low-pressure inlet 32, receiving the air circulating in the ram air channel 25 upstream of the jet pump 29, i.e. downstream of the intermediate exchanger 20.

The first inlet 34 of the jet pump 29 allows the feeding of at least one first outlet nozzle 44 of the jet pump 29 injecting compressed air into the ram air channel 25 downstream of the jet pump 29, i.e. in the direction of the outlet 26 of the ram air channel 25. Consequently, each first nozzle 44 can be adapted and optimised with respect to the pressure and flowrate of the compressed air delivered by the first compressor 13 to allow the ventilation of the ram air channel 25 and thus in particular the operation of the intermediate exchanger 20 when the aircraft is on the ground.

The second inlet 38 of the jet pump 29 allows the feeding of at least one second outlet nozzle 48 of the jet pump 29 injecting compressed air into the ram air channel 25 downstream of the jet pump 29, i.e. in the direction of the outlet 26 of the ram air channel 25. Consequently, each second nozzle 48 can be adapted and optimised with respect to the pressure and flowrate of the compressed air delivered by the second compressor 17 to allow the ventilation of the ram air channel 25 and thus in particular the operation of the intermediate exchanger 20 when the aircraft is on the ground.

Therefore, the multiple jet pump 29 can be fed solely from the first compressor 13 or solely from the second compressor 17 or from the two compressors 13, 17 in order to ventilate the ram air channel 25 when the aircraft is on the ground. In all of the feeding conditions for the jet pump 29, this pump operates in an optimum manner because each of the outlet nozzles are optimised to the air which it receives. Furthermore, the ram air channel 25 can always be ventilated, even in the case of a fault of one or the other of the compressors 13, 17, or when one or the other of the compressors is shut off, e.g. in the event of a surge in one of the compressors 13, 17. It is thus possible to precisely modulate the operation of each compressor 13, 17 so as to avoid any surge phenomenon whilst maintaining the function of ventilating the ram air channel by the multiple jet pump 29. And, in the event of a surge in a compressor 13, 17, this surge phenomenon has in any event no adverse effect on the other compressor, the multiple jet pump 29 isolating the two compressors 13, 17 from each other.

In the exemplified embodiment illustrated in FIGS. 2 to 5, the jet pump 29 comprises a mounting plate 30 at the inlet of a plenum 31, a first central nozzle 44 injecting compressed air in an axial injection direction orthogonal to the plate 30 towards the outlet 26 of the ram air channel 25, and a series of four second peripheral nozzles 48 arranged in a circle around the first nozzle 44, the second nozzles 48 injecting compressed air in the same axial injection direction.

The first nozzle 44 is fed by the first compressed air inlet 34 formed by a bent tube connected on the side external to the plate 30 to the first nozzle 44. The second nozzles 48 are fed by the second compressed air inlet 38 formed by a bent tube connected to the outside of the plate 30 by a tapered sleeve 41. The bent tube forming the first air inlet 34 passes radially through the tapered sleeve 41 so as to be connected to the first central nozzle 44. The tapered sleeve 41 is connected to the second peripheral nozzles 48 in order to feed them with compressed air.

Preferably, the second nozzles 48 are all similar, of the same shape and dimensions, and have axial ends 49 located in a single plane in parallel with the plate 30, and the first central nozzle 44 has an axial end 45 placed between the second nozzles 48, i.e. set back towards the plate 30 with respect to the axial ends 49 of the second nozzles 48, the first central nozzle 44 being of a shorter length than the second peripheral nozzles 48. In this manner, the passage of air at low pressure between the second nozzles 48 is encouraged, thus providing improved air agitation, in particular when the second nozzles 48 are fed with compressed air and the first central nozzle 44 is not. In fact, in normal operation, if the flowrate constraints in the ram air channel so allow, it is preferred to feed the second peripheral nozzles 48 rather than the first central nozzle 44 in order to ventilate the ram air channel, these second peripheral nozzles 48 providing improved agitation and having improved acoustic performances.

The part shown in FIGS. 2 and 3 forming the compressed air inlets 34, 38, the mounting plate 30 and the outlet nozzles 44, 48 of the jet pump 29 can be formed in particular by any additive manufacturing technique, i.e. by three-dimensional printing.

The plenum 31 extends longitudinally in parallel with the axial injection direction of the nozzles 44, 48, the plate 30 being mounted at an axial end 50 of the plenum 31. The plenum 31 has a first inlet segment 51 formed by the peripheral wall 42 of the ram air channel 25, this first segment 51 extending from the axial end 50 bearing the plate 30 and containing the nozzles 44, 48. This first segment 51 receives radially, i.e. orthogonally to the axial injection direction, from the outside to the inside, the air circulating in the ram air channel 25 downstream of the intermediate exchanger 20, and thus forms a low-pressure air inlet 32 of the jet pump 29. The plenum 31 has a neck 52 with a minimum cross-section (considered without the nozzles 44, 48), in particular one which is reduced with respect to that of the first segment 51. The different nozzles 44, 48 are arranged in the first segment 51 such that the compressed air delivered by these nozzles 44, 48 is oriented towards the neck 52, within the cross-section of the latter. Advantageously, the axial ends 49 of the longest nozzles 48 are arranged immediately upstream of the neck 52. The plenum 31 has, from the neck 52, a diverging outlet segment 53 acting as a mixer and diffuser, in which the low-pressure air from upstream of the ram air channel 25 and the compressed air delivered by the nozzles 44, 48 mix. The plenum 31 thus forms a Venturi tube facilitating the mixing of the flows and accelerating the resulting flow. The axial end of the divergent 53 of the plenum 31 forms the outlet 26 of the ram air channel 25.

The outlet segment 53 of the plenum 31 is further advantageously connected by a bypass duct 54 to the ram air channel 25 upstream of the low-pressure air inlet 32 of the jet pump 29. This bypass duct 54 is provided with a valve 55 allowing the bypass duct 54 to be closed when compressed air is fed to at least one of the inlets 34, 38 of the jet pump 29, the air from the intermediate exchanger 20 in the ram air channel 25 passing into the jet pump 29; or allowing the bypass duct 54 to be opened when the jet pump 29 is not fed with compressed air such that air arriving downstream of the intermediate exchanger 20 passes directly into the bypass duct 54 towards the outlet 26 of the ram air channel 25. It should be noted that when the bypass duct 54 is open, some of the flow downstream of the intermediate exchanger 20 still passes into the plenum 31 of the jet pump 29.

Tests have shown that the use of a multiple pump 29 in accordance with the invention allows, with respect to a pump with a single nozzle as per the prior art:
 a 10% to 20% reduction in the injection pressure at the inlet of the pump for the same flowrate generated by the pump; this results in a reduction in acoustic level and a reduction in consumed energy;
 an approximately 20% increase in the mass flowrate generated in the ram air channel for the same outlet flowrate of the pump.

The invention can be varied in many ways with respect to the embodiments described above and illustrated in the figures. In particular, the jet pump 29 can be provided with more than two compressed air inlets and the outlet nozzles can be arranged in any suitable manner, whether or not in successive concentric circles. Furthermore, in general, a single jet pump provided with several compressed air inlets and several outlet nozzles in accordance with the invention is sufficient to ventilate a single ram air channel. That being said, there is to nothing to prevent the provision of several jet pumps each provided with several inlets and several outlet nozzles in accordance with the invention in a single ram air channel. There is also nothing to prevent the provision of several ram air channels for a single environmental control device and a method in accordance with the invention for ventilating each of these ram air channels or only some of them. The invention is also applicable to the ventilation of a ram air channel of a vehicle other than an aircraft, e.g. a train, in particular a high-speed train.

The invention claimed is:

1. Method for ventilating a ram air channel (25) for a vehicle, said ram air channel (25) comprising:
    a ram air inlet (24) capable of receiving an air flow at ram air pressure under the effect of a movement of the vehicle,
    at least one heat exchanger (20) arranged to be able to receive at least one portion of said ram air flow,
method in which the ram air channel is provided with at least one jet pump (29) arranged to be able to be fed with compressed air delivered by compressed air sources (13, 17) of the vehicle, wherein the ram air channel (25) is provided with at least one jet pump (29), named multiple-jet pump (29):
    comprising a plurality of compressed air inlets (34, 38) and a plurality of compressed air outlet nozzles (44, 48), each nozzle (44, 48) being connected to at least one of said compressed air inlets (34, 38),
    of which said compressed air inlets (34, 38) are connected to a plurality of compressed air sources (13, 17) of the vehicle,
    of which a first nozzle (44) is connected to at least one first compressed air inlet (34) connected to at least one first compressed air source (13) of the vehicle, this first nozzle (44) being able to receive compressed air delivered by at least one such first compressed air source (13) of the vehicle,
    of which at least one nozzle (48), named second nozzle (48), separate from said first nozzle (44) is:
        isolated from each first compressed air inlet (34),
        connected to at least one inlet, named second compressed air inlet (38):
            separate from each first compressed air inlet (34),
            and connected to at least one compressed air source of the vehicle, named second compressed air source (17), separate from each first compressed air source (13),
    each second nozzle (48) being able to receive compressed air delivered by at least one such second compressed air source (17) without being able to receive compressed air delivered by any first compressed air source (13).

2. Method according to claim 1, wherein each nozzle (44, 48) of a multiple-jet pump (29) is connected to a single compressed air inlet (34, 38) of this multiple-jet pump (29), and wherein each compressed air inlet (34, 38) of this multiple-jet pump (29) is connected to a single compressed air source (13, 17) of the vehicle, each nozzle (44, 48) of this multiple-jet pump (29) being able to receive only compressed air delivered by a single compressed air source (13, 17) of the vehicle.

3. Method according to claim 2, wherein each compressed air source (13, 17) of the vehicle is connected to a single compressed air inlet (34, 38) of a multiple-jet pump (29).

4. Method according to claim 2, wherein at least one rotary compressor of an environmental control device of at least one cabin of the vehicle is connected to at least one inlet of a multiple-jet pump (29).

5. Method according to claim 1, wherein each compressed air source (13, 17) of the vehicle is connected to a single compressed air inlet (34, 38) of a multiple-jet pump (29).

6. Method according to claim 5, wherein at least one rotary compressor of an environmental control device of at least one cabin of the vehicle is connected to at least one inlet of a multiple-jet pump (29).

7. Method according to claim 1, wherein at least one rotary compressor of an environmental control device of at least one cabin of the vehicle is connected to at least one inlet of a multiple-jet pump (29).

8. Environmental control device for at least one vehicle cabin (11), comprising:
    a plurality of compressed air sources (13, 17),
    at least one ram air channel (25), comprising:
        a ram air inlet (24) capable of receiving an air flow at ram air pressure under the effect of a movement of the vehicle,
        at least one heat exchanger (20) arranged to be able to receive at least one portion of said ram air flow,
        at least one jet pump (29) arranged to be able to be fed with compressed air delivered by at least some of said compressed air sources, wherein
at least one ram air channel (25) comprises at least one jet pump (29), named multiple-jet pump (29):
    comprising a plurality of compressed air inlets (34, 38) and a plurality of compressed air outlet nozzles (44, 48), each nozzle (44, 48) being connected to at least one of said compressed air inlets (34, 38),
    of which said compressed air inlets (34, 38) are connected to a plurality of said compressed air sources (13, 17),
    of which a first nozzle (44) is connected to at least one first compressed air inlet (34) connected to at least one first compressed air source (13), this first nozzle (44) being able to receive compressed air delivered by at least one such first compressed air source (13),
    of which at least one nozzle (48), named second nozzle (48), separate from said first nozzle (44) is:
        isolated from each first compressed air inlet (34),
        connected to at least one inlet, named second compressed air inlet (38):
            separate from each first compressed air inlet (34),
            and connected to at least one compressed air source, named second compressed air source (17), separate from each first compressed air source (13),
    each second nozzle (48) being able to receive compressed air delivered by at least one such second compressed air source (17) without being able to receive compressed air delivered by any first compressed air source (13).

9. Device according to claim 8, wherein each nozzle (44, 48) of a multiple-jet pump (29) is connected to a single compressed air inlet (34, 38) of this multiple-jet pump (29), and wherein each compressed air inlet (34, 38) of this multiple-jet pump (29) is connected to a single compressed air source (13, 17) of the vehicle, each nozzle (44, 48) of this multiple-jet pump (29) being able to receive only compressed air delivered by a single compressed air source (13, 17) of the vehicle.

10. Device according to claim 9, wherein each compressed air source (13, 17) of the vehicle is connected to a single compressed air inlet (34, 38) of a multiple-jet pump (29).

11. Device according to claim 9, wherein at least one of said first and second compressed air sources (13, 17) is a rotary compressor.

12. Device according to claim 8, wherein each compressed air source (13, 17) of the vehicle is connected to a single compressed air inlet (34, 38) of a multiple-jet pump (29).

13. Device according to claim 8, wherein at least one of said first and second compressed air sources (13, 17) is a rotary compressor.

14. Device according to claim 8, wherein at least one multiple-jet pump (29) has at least one first central nozzle (44) connected to said first compressed air inlet (34) and at least one series of second peripheral nozzles (48) connected to a second compressed air inlet (38) and extending around each first central nozzle (44).

15. Device according to claim 8, wherein each multiple-jet pump (29) comprises:
an outlet plenum (31) arranged to be able to receive the compressed air delivered by each nozzle (44, 48),
an air inlet, named low-pressure air inlet (32), arranged to receive air from the ram air inlet (24) of the ram air channel (25) and to cause said air to circulate in said plenum (31),
said nozzles (44, 48) and said low-pressure air inlet (32) being arranged such that the compressed air from any one of the nozzles (44, 48) can mix in said plenum (31) with the air delivered by said low-pressure air inlet (32), forming a combination flow of air causing ventilation of the ram air channel (25).

16. Device according to claim 15, wherein said low-pressure air inlet (32) is a radial air inlet to the nozzles (44, 48) of the multiple-jet pump (29).

17. Device according to claim 15, wherein the ram air channel (25) is provided with a duct (54) for bypassing said jet pump (29), this bypass duct (54) connecting a zone of the ram air channel (25) upstream of said low-pressure air inlet (32) to said plenum (31).

18. Device according to claim 17, wherein said bypass duct (54) is provided with a valve (55) adapted to:
allow a circulation of air in the bypass duct (54) when no compressed air inlets (34, 38) are fed with compressed air,
allow a circulation of air in the low-pressure air inlet (32) of the jet pump (29) when at least one of the compressed air inlets (34, 38) is fed with compressed air.

19. Device according to claim 15, characterised in that said plenum (31) communicates with an air outlet (26) of the ram air channel to the atmosphere outside of the vehicle.

20. Vehicle comprising at least one environmental control device according to claim 8.

* * * * *